(No Model.)
R. GALLOWAY.
SUPPORT FOR THE HOES OF AGRICULTURAL IMPLEMENTS.
No. 498,165. Patented May 23, 1893.
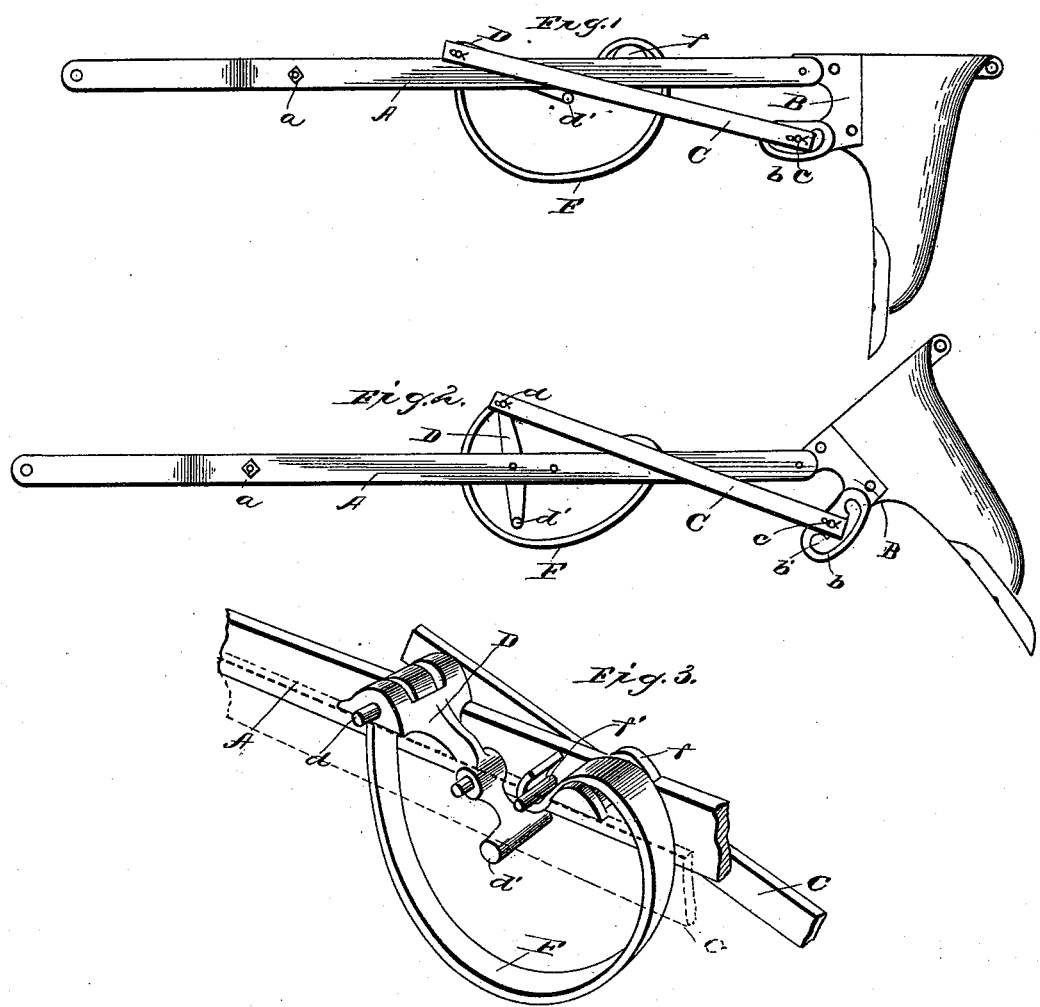
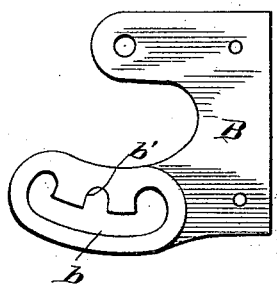
Witnesses 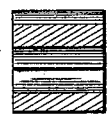
J. M. Fowler Jr.
Alex J. Stewart
Inventor
Robert Galloway
By Church & Church
his Attorneys

UNITED STATES PATENT OFFICE.

ROBERT GALLOWAY, OF MACEDON, NEW YORK.

SUPPORT FOR THE HOES OF AGRICULTURAL IMPLEMENTS.

SPECIFICATION forming part of Letters Patent No. 498,165, dated May 23, 1893.

Application filed December 12, 1892. Serial No. 454,846. (No model.)

*To all whom it may concern:*

Be it known that I, ROBERT GALLOWAY, of Macedon, in the county of Wayne and State of New York, have invented certain new and useful Improvements in Supports for the Hoes of Agricultural Implements; and I do hereby declare the following to be a full, clear, and exact description of the same, reference being had to the accompanying drawings, forming a part of this specification, and to the letters of reference marked thereon.

My present invention relates to improvements in the supporting mechanism for hoes of agricultural implements and particularly to that class in which the hoe is held with a yielding pressure with sufficient strength to resist ordinary strains incident to the proper performance of its work, but which will allow the hoe to give when a breaking strain comes upon it, the object of the invention being to simplify and improve the mechanism, whereby the hoe may be readily adjusted to work at any desired angle without the necessity of removing bolts, &c., and which when adjusted cannot be accidentally moved out of adjustment.

The invention consists in certain novel details of construction and combinations and arrangements of parts all as will be now described and pointed out particularly in the appended claims.

Referring to the accompanying drawings: Figure 1 is a side elevation of a drill tooth showing the application of my invention. Fig. 2 is a similar view with the tooth sprung back as by striking an obstruction. Fig. 3 is a detail perspective with the side pieces and braces broken away and shown in dotted lines. Fig. 4 is a detail side elevation of the supporting ear or bracket for carrying the tooth.

Similar letters of reference in the several figures indicate the same parts.

The letter A indicates the drag bar adapted to be pivotally connected with the frame of the machine in any preferred or ordinary manner, and preferably constructed of two pieces of strap iron slightly separated throughout their length to accommodate the parts to be presently described, but rigidly connected as by bolt $a$ to form a rigid structure.

Between the side pieces of the drag bar at the rear end is pivotally mounted the tooth carrying ear or bracket B, preferably cast separate from the tooth, as shown, to adapt it for application to any style tooth or the teeth of different kinds of implements. This bracket has its lower portion extended forward somewhat and provided with a transverse segmental slot $b$ having a series of notches $b'$ in its upper side into any one of which the cross pin $c$ between the double braces C may be placed. The braces pass outside of the drag bar and therefore the portion of the bracket having the slot therein should be of sufficient width or thickness to enable straight braces to be employed, a preferable construction both for strength and economy. At the upper and forward ends the braces are preferably connected by a through bolt $d$ to the upper and forward end of a locking lever D which latter is pivotally connected to the drag bar at an intermediate point. The upper end of the locking lever is preferably bifurcated to accommodate the spring F as will be presently described and also to afford a bearing on the top of the drag bar. The lower end is T-shape as at $d'$, the projections or arms being extended laterally beneath the drag bar and beneath the braces C as shown clearly in Fig. 3, thus when the upper end of the locking lever is held down, the tendency of the rear or T-shaped end is to elevate the rear ends of the braces and hold the same firmly in the notch in the bracket to which they have been adjusted. The length of the braces is so proportioned that with the bolt $d$ as a center a circle struck through the pivot of the bracket B will also pass through the pin $c$ hence when the said bracket and tooth are swung back by an obstruction, the tendency will be to draw the pin more firmly into the notch and when the parts are in normal, position as shown in Fig. 1 the projections on the bottom of the locking lever hold the same in the notch, hence there is little or no liability of the adjustment being accidentally changed. When, however, it is desired to change the adjustment or angle at which the tooth works, it may be readily accomplished by pressing down on the rear ends of the braces to disengage the pin, then setting the tooth and allowing the pin to spring back into one of the notches. The outer wall of the slot prevents the entire separation of the bracket and braces, and what is of equally as great, if not greater importance, it prevents the notches from becoming filled up with dirt and rubbish, such as will accumulate and climb up on the front of the teeth of this class of implements.

Obviously, any ordinary spring may be employed to hold the front end of the locking lever down, but I prefer to employ a flat bodied spring F one end of which is hooked over the bolt $d$ while its body curves around beneath the drag bar, passes up between the braces back of the lever and has its opposite end passed first over a block $f$ resting on top of the bar and then hooked beneath a bolt or rivet $f'$ connecting the sides of the drag bar. This gives a powerful spring action, and at the same time the spring is held against lateral movement and no small and delicate parts are employed such as are liable to become broken by rough handling or filled with dirt and rubbish. The spring further protects the lever, &c., fom rubbish which is caught by the tooth. The center upon which the locking lever turns, it will be noted, is just a little below a straight line between the bolt $d$ and pin $c$, hence it requires a strong pressure to cause the tooth to give backward until the lever has swung up, when the center being out of line, the movement is much easier and does not tend to raise the machine from the ground as the tooth passes over the obstruction.

It will be further particularly observed that by the employment of a segmental slot in the tooth bracket the relative positions of these centers when in normal position always remains the same, no matter at what angle the tooth is set.

I am aware that it is not broadly new to employ a series of notches for forming the connection between the ear on a tooth and the brace and to hold the brace up by the pressure of the spring which returns the tooth to normal position, hence I do not wish to be understood as claiming such structure, my invention consisting simply in the structure shown and in which the separation of the braces and bracket is prevented and the advantages heretofore pointed out are secured.

Having thus described my invention, what I claim as new is—

1. In an agricultural implement, the combination with the drag bar, the tooth bracket pivotally connected to the rear end thereof and having the forward extension notched upon the under side, the braces on each side of the drag bar and a pin on the braces cooperating with any one of the notches in the tooth bracket, of the pivoted locking lever pivotally connected to the braces at the upper end and having the T-shaped lower end projecting beneath and out on each side of the drag-bar and engaging the under side of the braces to hold them in engagement with the notches, and the spring passing through and connected to the drag bar in rear of the locking lever at one end, and passing through and pivotally connected to the upper end of the locking lever at the opposite end; substantially as described.

2. In an agricultural implement, the combination with the drag bar, the spring pressed locking lever pivotally connected thereto and the brace pivotally connected to the upper end of the locking lever, of the tooth bracket pivoted to the rear end of the drag bar and having the forward extension provided with the segmental slot with its upper wall notched and the pin on the brace for cooperating with said notches whereby the tooth may be adjusted, but the detachment of the brace and bracket is prevented; substantially as described.

3. In an agricultural implement, the combination with the drag bar, the spring pressed locking lever pivotally connected thereto, the lateral extensions on said lever below the center, and braces pivotally connected to the upper end of said lever and resting on said lateral extensions, of the tooth bracket pivotally connected to the rear end of the drag bar and having the segmental slot therein with the upper wall notched and the pin on the braces held in cooperation with said notches by the spring pressed locking lever, whereby said braces may be depressed to adjust the tooth without becoming detached therefrom; substantially as described.

4. The combination with the drag bar formed by the two separate side pieces the locking lever pivoted between said side pieces, the spring cooperating with said locking lever and the braces pivotally connected to the locking lever and passing down on each side of the drag bar, of the tooth bracket pivoted between the sides of the drag bar and having the slotted and notched extension at the bottom for cooperation with the braces formed of a thickness corresponding to the thickness of the drag bar whereby the ends of the braces are held apart and work freely outside of the drag bar; substantially as described.

5. In an agricultural implement, the combination with the drag bar, the spring pressed locking lever pivotally connected thereto and the brace pivotally connected to the upper end of the locking lever, of the tooth pivoted to the rear end of the drag bar and having the forward extension provided with the segmental slot with its upper wall notched, the lower or outer wall protecting said notches and the pin on the braces held in cooperation with said notches by the spring pressed locking lever, whereby said braces may be depressed to adjust the tooth without becoming detached therefrom; substantially as described.

ROBERT GALLOWAY.

Witnesses:
WALTER E. RATHBUN,
ALX. BRANNEN.